United States Patent Office 3,316,256
Patented Apr. 25, 1967

3,316,256
CERTAIN AZOLINYL AND AZINYL ISOXAZOLES
Hideo Kano, Kyoto-shi, and Haruo Nishimura, Ashiya-shi, Japan, assignors to Shinonogi & Co., Ltd., Osaka, Japan
No Drawing. Filed Sept. 23, 1965, Ser. No. 489,727
Claims priority, application Japan, Dec. 25, 1964, 39/73,361, 39/73,364; Feb. 16, 1965, 40/8,782
16 Claims. (Cl. 260—244)

The present invention relates to disubstituted isoxazole derivatives and non-toxic salts thereof. More particularly, it relates to disubstituted isoxazole derivatives represented by the following formula:

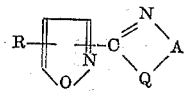

(I)

and to pharmaceutically acceptable non-toxic salts thereof.

In the above Formula I, R is a lower alkyl group (e.g. methyl, ethyl, propyl, isopropyl, butyl, isobutyl) or a phenyl group. Q is an oxygen or sulfur atom. A is a 1,2- or 1,3-alkylene group having 2 to 10 carbon atoms. That is, A may represent, for instance, ethylene, 1-methylethylene, 1-ethylethylene, 1,1-dimethylethylene, 1,2 - dimethylethylene, 1,1,2-trimethylethylene, 1 - methyl - 2-propylethylene, 1-butyl - 2 - ethylethylene, propylene, 1-methylpropylene, 1-methyl-3-ethylpropylene, 1,1-dimethyl-2-ethylpropylene, 1-ethyl-2-methyl-3-propylpropylene, 1,1,2,3-tetramethylpropylene or the like. Accordingly, the substituent represented by the formula:

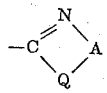

is a substituted or unsubstituted 2-oxazolin-2-yl group when Q is an oxygen atom and A is a 1,2-alkylene group, a substituted or unsubstituted 5,6-dihydro-4H-1,3-oxazin-2-yl group when Q is an oxygen atom and A is a 1,3-alkylene group, a substituted or unsubstituted 2-thiazolin-2-yl group when Q is a sulfur atom and A is a 1,2-alkylene group, or a substituted or unsubstituted 5,6-dihydro-4H-1,3-thiazin-2-yl group when Q is a sulfur atom and A is a 1,3-alkylene group.

In its preferred aspect, the invention relates to isoxazole derivatives having the structural formulae:

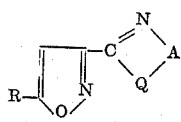

(I′)

and

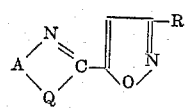

(I″)

wherein R, Q and A each has the same significance as designated above.

The objective disubstituted isoxazole derivatives (I) can be prepared by subjecting substituted alkylcarbamoylisoxazole derivatives represented by the following fromula:

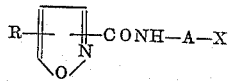

(II)

wherein X is a hydroxyl group, an acyloxy group (e.g. acetoxy, propionyloxy, benzoyloxy, methanesulfonyloxy, benzenesulfonyloxy, ethoxycarbonyloxy) or a halogen atom (e.g. chlorine, bromine, iodine) and R and A each has the same significance as designated above, to an intramolecular condensation reaction in the presence of a condensing agent.

The starting material of the present invention, namely substituted alkylcarbamoylisoxazole derivative (II), can be prepared by various methods. One of the typical methods is shown in the following scheme:

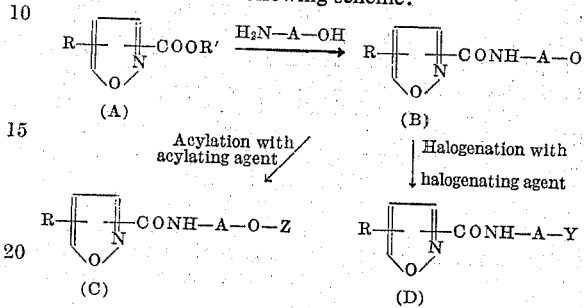

wherein R′ is a lower alkyl group (e.g. methyl, ethyl, propyl, isopropyl, butyl, isobutyl), Y is a halogen atom (e.g. chlorine, bromine, iodine), Z is an acyl group (e.g. acetyl, propionyl, benzoyl, methanesulfonyl, benzenesulfonyl, toluenesulfonyl, ethoxycarbonyl) and R and A each has the same significance as designated above. Any desired substituted alkylcarbamoylisoxazole derivative (II) of the formula B, C or D, can be prepared from a corresponding isoxazole carboxylic acid ester A.

Examples of the starting material of the present invention, namely substituted alkylcarbamoylisoxazole derivative (II), include 3-methyl-5-(2-chloroethylcarbamoyl)-isoxazole,
3-methyl-5-(1-methyl-2-bromoethylcarbamoyl)-isoxazole,
3-methyl-5-(1,1-dimethyl-2-iodoethylcarbamoyl)-isoxazole,
3-ethyl-5-(2-hydroxyethylcarbamoyl)-isoxazole,
3-propyl-5-(2-methanesulfonyloxyethylcarbamoyl)-isoxazole,
3-isobutyl-5-(1,1,2-trimethyl-2-chloroethylcarbamoyl)-isoxazole,
3-phenyl-5-(2-chloroethylcarbamoyl)-isoxazole,
3-phenyl-5-(1-ethyl-2-bromoethylcarbamoyl)-isoxazole,
3-methyl-5-(3-chloropropylcarbamoyl)-isoxazole,
3-ethyl-5-(1,2,3-trimethyl-3-bromopropylcarbamoyl)-isoxazole,
3-phenyl-5-(3-toluenesulfonyloxypropylcarbamoyl)-isoxazole,
3-phenyl-5-(1-ethyl-3-acetoxypropylcarbamoyl)-isoxazole,
3-(2-chloroethylcarbamoyl)-5-methylisoxazole,
3-(1-methyl-2-bromoethylcarbamoyl)-5-methylisoxazole,
3-(1,1-dimethyl-2-iodoethylcarbamoyl)-5-methylisoxazole,
3-(2-hydroxyethylcarbamoyl)-5-ethylisoxazole,
3-(2-methanesulfonyloxyethylcarbamoyl)-5-propylisoxazole,
3-(1,1,2-trimethyl-2-chloroethylcarbamoyl)-5-isobutylisoxazole,
3-(2-hydroxyethylcarbamoyl)-5-phenylisoxazole,
3-(1-ethyl-2-bromoethylcarbamoyl)-5-phenylisoxazole,
3-(3-chloropropylcarbamoyl)-5-methylisoxazole,
3-(1,2,3-trimethyl-3-bromopropylcarbamoyl)-5-ethylisoxazole,
3-(3-toluenesulfonyloxypropylcarbamoyl)-5-phenylisoxazole,
3-(1-ethyl-3-acetoxypropyl)-5-phenylisoxazole, etc.

According to the process of the present invention, the intramolecular condensation reaction of the substituted alkylcarbamoylisoxazole derivative (II) is carried out at a wide range of temperature from about 20° C. (room temperature) to about 200° C. in the presence of a condensing agent. Usually, the reaction is carried out in an inert solvent selected from benzene, toluene, xylene, ether, dioxane, tetrahydrofuran, methanol, ethanol, water and the like. But it can be executed without solvent, especially when the condensing agent is liquid.

The condensing agent to be employed in the present process may be selected from dehydrating agents including thionyl halides (e.g. thionyl chloride, thionyl bromide), phosphoryl halides (e.g. phosphoryl chloride, phosphoryl bromide), phosphorus trihalides (e.g. phosphorus trichloride, phosphorus tribromide), phosphorus pentahalide (e.g. phosphorus pentachloride, phosphorus pentabromide), mineral acids (e.g. sulfuric acid, hydrochloric acid), hydrogen halides (e.g. hydrogen chloride, hydrogen bromide), phosphorus pentoxide, phosphorus pentasulfide and the like and acid eliminating agents including alkali metal hydroxides (e.g. sodium hydroxide, potassium hydroxide), alkaline earth metal hydroxides (e.g. calcium hydroxide, barium hydroxide), alkali metal bicarbonates (e.g. sodium bicarbonate, potassium bicarbonate), alkali metal carbonates (e.g. sodium carbonate, potassium carbonate), alkali metal acetates (e.g. sodium acetate, potassium acetate), alkali metal alkoxides (e.g. sodium methoxide, potassium ethoxide), organic bases (e.g. pyridine, picoline, lutidine, collidine, triethylamine) and the like in consideration of the reactivity of the starting material (II). Generally stated, when the substituent of the starting material (II) represented by the symbol "X" in the foregoing general formula is a hydroxyl group, the use of the dehydrating agent is recommended. And, the use of the acid eliminating agent is preferred, when the symbol "X" represents an acyloxy group or a halogen atom.

It should be noted that the thiazolinyl and thiazinyl compounds can be obtained only when phosphorus pentasulfide is used as the condensing agent. Therefore, phosphorus pentasulfide must be used as the condensing agent for the production of the thiazolinyl or thiazinyl compounds. In this case, it is preferred to carry out the reaction without reaction solvent.

Specific examples of the disubstituted isoxazole derivatives (I) prepared by the present process are 3-methyl-5-(2-oxazoline-2-yl)-isoxazole,
3-methyl-5-(2-thiazolin-2-yl)-isoxazole,
3-methyl-5-(4-methyl-2-oxazolin-2-yl)-isoxazole,
3-methyl-5-(4-methyl-2-thiazolin-2-yl)-isoxazole,
3-methyl-5-(4,4-dimethyl-2-oxazolin-2-yl)-isoxazole,
3-methyl-5-(4,4-dimethyl-2-thiazolin-2-yl)-isoxazole,
3-ethyl-5-(2-oxazolin-2-yl)-isoxazole,
3-ethyl-5-(2-thiazolin-2-yl)-isoxazole,
3-propyl-5-(2-oxazolin-2-yl)-isoxazole,
3-propyl-5-(2-thiazolin-2-yl)-isoxazole,
3-isobutyl-5-(4,4,5-trimethyl-2-oxazolin-2-yl)-isoxazole,
3-isobutyl-5-(4,4,5-trimethyl-2-thiazolin-2-yl)-isoxazole,
3-phenyl-5-(2-oxazolin-2-yl)-isoxazole,
3-phenyl-5-(2-thiazolin-2-yl)-isoxazole,
3-phenyl-5-(4-ethyl-2-oxazolin-2-yl)-isoxazole,
3-phenyl-5-(4-ethyl-2-thiazolin-2-yl)-isoxazole,
3-methyl-5-(5,6-dihydro-4H-1,3-oxazin-2-yl)-isoxazole,
3-methyl-5-(5,6-dihydro-4H-1,3-thiazin-2-yl)-isoxazole,
3-ethyl-5-(4,5,6-trimethyl-5,6-dihydro-4H-1,3-oxazin-2-yl)-isoxazole,
3-ethyl-5-(4,5,6-trimethyl-5,6-dihydro-4H-1,3-thiazin-2-yl)-isoxazole,
3-phenyl-5-(5,6-dihydro-4H-1,3-oxazin-2-yl)-isoxazole,
3-phenyl-5-(5,6-dihydro-4H-1,3-thiazin-2-yl)-isoxazole,
3-phenyl-5-(4-ethyl-5,6-dihydro-4H-1,3-oxazin-2-yl)-isoxazole,
3-phenyl-5-(4-ethyl-5,6-dihydro-4H-1,3-thiazin-2-yl)-isoxazole,
3-(2-oxazolin-2-yl)-5-methylisoxazole,
3-(2-thiazolin-2-yl)-5-methylisoxazole,
3-(4-methyl-2-oxazolin-2-yl)-5-methylisoxazole,
3-(4-methyl-2-thiazolin-2-yl)-5-methylisoxazole,
3-(4,4-dimethyl-2-oxazolin-2-yl)-5-methylisoxazole,
3-(4,4-dimethyl-2-thiazolin-2-yl)-5-methylisoxazole,
3-(2-oxazolin-2-yl)-5-ethylisoxazole,
3-(2-thiazolin-2-yl)-5-ethylisoxazole,
3-(2-oxazolin-2-yl)-5-propylisoxazole,
3-(2-thiazole-2-yl)-5-propylisoxazole,
3-(4,4,5-trimethyl-2-oxazolin-2-yl)-5-isobutylisoxazole,
3-(4,4,5-trimethyl-2-thiazolin-2-yl)-5-isobutylisoxazole,
3-(2-oxazolin-2-yl)-5-phenylisoxazole,
3-(2-thiazolin-2-yl)-5-phenylisoxazole,
3-(4-ethyl-2-oxazolin-2-yl)-5-phenylisoxazole,
3-(4-ethyl-2-thiazolin-2-yl)-5-phenylisoxazole,
3-(5,6-dihydro-4H-1,3-oxazin-2-yl)-5-methylisoxazole,
3-(5,6-dihydro-4H-1,3-thiazin-2-yl)-5-methylisoxazole,
3-(4,5,6-trimethyl-5,6-dihydro-4H-1,3-oxazin-2yl)-5-ethylisoxazole,
3-(4,5,6-trimethyl-5,6-dihydro-4H-1,3-thiazin-2-yl)-5-ethylisoxazole,
3-(5,6-dihydro-4H-1,3-oxazin-2-yl)-5-phenylisoxazole,
3-(5,6-dihydro-4H-1,3-thiazin-2-yl)-5-phenylisoxazole,
3-(4-ethyl-5,6-dihydro-4H-1,3-oxazin-2yl)-5-phenylisoxazole,
3-(4-ethyl-5,6-dihydro-4H-1,3-thiazin-2-yl)-5-phenylisoxazole, etc.

For convenience on preparation, the thus produced disubstituted isoxazole derivatives (I) may be converted into their acid addition salts, for instance, by treating the base with an acid such as hydrochloric, hydrobromic, hydroiodic, sulfuric, nitric, phosphoric, thiocyanic, carbonic, acetic, propionic, oxalic, citric, tartaric, succinic, salicylic, benzoic, palmitic, benzenesulfonic or toluenesulfonic acid in a suitable solvent such as water, methanol, ethanol, acetone, dioxane or the like. There are thus produced the corresponding hydrochloride, hydrobromide, hydroiodide, sulfate, nitrate, phospate, thiocyanate, carbonate, acetate, propionate, oxalate, citrate, tartrate, succinate, salicylate, benzoate, palmitate, benzenesulfonate or toluenesulfonate.

The disubstituted isoxazole derivatives (I) and nontoxic salts thereof exert certain beneficial effects and excellent synergistic effects in combination with sulfonamides or antibiotics against bacterial infections in living bodies, and are particularly valuable when used in combination with sulfonamides or antibiotics in both topical and systemic applications.

For example, the thus produced 3-(2-oxazolin -2-yl)-5-methylisoxazole exhibits certain protective effects against experimental infections with pathogenic microorganisms in mice as shown in Table 1. Groups of 10 DS mice weighing 15 g. to 16 g. were infected by intraperitoneal injection of 10 minimal lethal dose (MLD) of *Diplococcus pneumoniae, Salmonella typhi-murium* or *Salmonella enteritidis*. Treatments were started 2 hours after infection by intraperitoneal administration with the medication being emulsified with gum arabic, and one dose was given daily for 4 consecutive days. From the data presented, it is quite evident that the compound protects mice against death from experimental infections with *Diplococcus pneumoniae, Salmonella typhi-murium* and *Salmonella enteritidis*.

In vivo observations on combined effect of 3-(2-oxazolin-2-yl)-5-methylisoxazole and various available antimicrobial drugs such as sulfonamides and antibiotics indicate that a synergistic effect occurs when the compound and these antimicrobial drugs are administered concomitantly. The activity of combination of 3-(2-oxazolin-2-yl)-5-methylisoxazole and various antimicrobial drugs as compared with the single drugs against pneumococcal infection in mice is given in Table 2. The infecting dose of pneumococci was 10 minimal lethal dose (MLD) by intraperitoneal injection. The mice were treated 2 hours after infection by oral or subcutaneous administration and one dose was given daily for 4 consecutive days. The survival of infected mice was recorded up to 10 days after infection. From the median effective dose ($ED_{50}$) values, it can be seen that the values obtained for the constituents of each combination are steadily less than of each antimicrobial drug alone and the relative potency is also increased with the amount of 3-(2-oxazolin-2-yl)-5-methylisoxazole added.

Furthermore, synergistic effects of 3-(2-oxazolin-2-yl)-5-methylisoxazole in the combination with a sulfonamide, 3-sulfanilamido-5-methylisoxazole (U.S. Patent No. 2,888,455), against experimental infections in mice with *Diplococcus pneumoniae, Streptococcus hemolyticus, Klebsiella pneumoniae* and *Salmonella enteritidis* tested in an analogous manner as mentioned above are shown in Table 3. From the Table 3, it can be pointed out that the in vivo activity of the sulfonamide against various bacterial infections is potentiated by 3-(2-oxazolin-2-yl)-5-methylisoxazole.

To determine the acute toxicity, 3-(2-oxazolin-2-yl)-5-methylisoxazole was emulsified with gum arabic and administered orally and intraperitoneally to mice. The median lethal dose ($LD_{50}$) was found to be about 3,500 mg./kg. orally and about 1,500 mg./kg. interaperitoneally.

The other disubstituted isoxazole derivatives provided by the present invention also potentiate the therapeutical effects of sulfonamides or antibiotics against bacterial infections. They can be administered in a variety of per se conventional ways, e.g. in the form of tablets, each constituted e.g. by a predetermined amount of a compound of the present invention and a suitable antimicrobial drug and a certain proportion of a per se conventional carrier.

The following examples represent presently-preferred embodiments of the present invention, but it is to be understood that the examples are given by way of illustration only and not of limitation. Parts by weight bear the same relation to parts by volume as do grams to millilitres. Temperatures are set forth in degrees centigrade.

TABLE 1.—3-(2-OXAZOLIN-2-YL)-5-METHYLISOXAZOLE TRIALS AGAINST EXPERIMENTAL INFECTIONS IN MICE

| Infections | Dosage, mg./kg. (intraperitoneally) | Mortality Nos. of survival on day(s) | | | | | | | | Survival to 10 days No. alive/ No. tested | Percent survival |
|---|---|---|---|---|---|---|---|---|---|---|---|
| | | 1 | 2 | 3 | 5 | 6 | 7 | 8 | 9 | 10 | | |
| *Diplococcus pneumoniae*, type I | 10 | 10 | 10 | 7 | 1 | 0 | | | | | 0/10 | 0 |
| | 20 | 10 | 10 | 8 | 6 | 6 | 5 | 5 | 5 | 5 | 5/10 | 50 |
| | 40 | 10 | 10 | 7 | 5 | 5 | 4 | 4 | 4 | 4 | 4/10 | 40 |
| *Salmonella typhi-murium* | None | 10 | 9 | 3 | 0 | | | | | | | |
| | 20 | 10 | 10 | 10 | 8 | 6 | 5 | 2 | 2 | 2 | 2/10 | 20 |
| | 40 | 10 | 10 | 10 | 9 | 5 | 4 | 2 | 2 | 1 | 1/10 | 10 |
| *Salmonella enteritidis* | None | 10 | 10 | 19 | 9 | 3 | 2 | 0 | | | 0/10 | 0 |
| | 20 | 10 | 10 | 10 | 9 | 2 | 2 | 2 | 2 | 2 | 2/10 | 20 |
| | 40 | 10 | 10 | 10 | 9 | 3 | 3 | 1 | 1 | 1 | 1/10 | 10 |
| | None | 10 | 10 | 7 | 7 | 3 | 2 | 1 | 0 | | 0/10 | 0 |

TABLE 2.—EFFECT OF 3-(2-OXAZOLIN-2-YL)-5-METHYLISOXAZOLE IN COMBINATION WITH VARIOUS ANTIMICROBIAL DRUGS ON THE MEDIAN EFFECTIVE DOSE ($ED_{50}$) OF EACH ANTIMICROBIAL DRUG IN PNEUMOCOCCUS INFECTION IN MICE

| Dosage of 3-(2-Oxazolin-2-yl)-5-methylisoxazole, mg./kg. (Orally) | 3-Sulfanilamido-5-methylisoxazole (Orally) | | Chloramphenicol (Orally) | | Oxytetracycline (Orally) | | Erthyromycin (Orally) | | Penicillin G (Subcutaneously) | |
|---|---|---|---|---|---|---|---|---|---|---|
| | $ED_{50}$, mg./kg. | Relative potency [1] | $ED_{50}$, mg./kg. | Relative potency [1] | $ED_{50}$, mg./kg. | Relative potency [1] | $ED_{50}$, mg./kg. | Relative potency [1] | $ED_{50}$, mg./kg. | Relative potency [1] |
| None | 900 | 1.0 | 290 | 1.0 | 30 | 1.0 | 35 | 1.0 | 6.5 | 1.0 |
| 100 | 520 | 1.7 | (2) | | (2) | | 19 | 1.8 | 4.0 | 1.6 |
| 200 | 280 | 3.2 | 200 | 1.4 | 25 | 1.2 | 19 | 1.8 | 4.0 | 1.6 |
| 400 | 150 | 6.0 | 150 | 1.9 | 19 | 1.5 | <12.5 | >2.8 | (2) | (2) |

[1] Relative potency=$ED_{50}$ of antimicrobial drug alone/$ED_{50}$ of antimicrobial drug combined with 3-(2-oxazolin-2-yl)-5-methylisoxazole.
[2] Not done.
NOTE.—Percent survivors of untreated controls are 0. Dosages are expressed on a weight basis. (Chloramphenicol: 1,000 mcg./mg. Oxytetracycline: 1,000 mcg./mg. Erythromycin: 974 mcg./mg. Penicillin G kalium salt: 1,500 µ/mg.)

TABLE 3.—EFFECT OF 3-(2-OXAZOLIN-2-YL)-5-METHYLISOXAZOLE ON THE SURVIVAL PERCENTAGE OF MICE AND MEDIAN EFFECTIVE DOSE ($ED_{50}$) OF 3-SULFANILAMIDO-5-METHYLISOXAZOLE I66 VARIOUS EXPERIMENTAL INFECTIONS IN MICE

| Infections | Dosage of 3-(2-Oxazolin-2-yl)-5-methylisoxazole, mg./kg. (Orally) | Percent survivors by following oral dose of 3-Sulfanilamido-5-methylisoxazole, mg./kg. | | | | | | $ED_{50}$ of 3-Sulfanilamido-5-methylisoxazole, mg./kg. | Relative potency [1] |
|---|---|---|---|---|---|---|---|---|---|
| | | None | 50 | 100 | 200 | 400 | 800 | | |
| *Diplococcus pneumoniae* | None | 0 | | 0 | 10 | 30 | 40 | 900 | 1.0 |
| | 100 | 0 | | 10 | 30 | 40 | 60 | 520 | 1.7 |
| | 200 | 0 | | 20 | 50 | 60 | 70 | 280 | 3.2 |
| | 400 | 30 | | 40 | 60 | 80 | 80 | 150 | 6.0 |
| *Streptococcus hemolyticus* | None | 0 | 10 | 40 | 60 | 90 | | 140 | 1.0 |
| | 100 | 0 | 40 | 50 | 70 | 90 | | 80 | 1.7 |
| | 200 | 10 | 60 | 80 | 90 | 100 | | 32 | 4.3 |
| | 400 | 0 | 70 | 80 | 100 | 100 | | <32 | >4.3 |
| *Klebsiella pneumoniae* | None | 0 | | 0 | 30 | 60 | 70 | 350 | 1.0 |
| | 100 | 10 | | 10 | 50 | 60 | 90 | 250 | 1.4 |
| | 200 | 0 | | 10 | 60 | 80 | 100 | 195 | 1.8 |
| | 400 | 10 | | 30 | 80 | 100 | 100 | 135 | 2.5 |
| *Salmonella enteritidis* | None | 0 | | 0 | 10 | 10 | 20 | (2) | (2) |
| | 100 | 0 | | 10 | 10 | 20 | 40 | 1,200 | |
| | 200 | 0 | | 10 | 20 | 40 | 50 | 750 | |
| | 400 | 10 | | 30 | 40 | 70 | 80 | 260 | |

[1] Same as Table 2.
[2] Not obtained.

Example 1

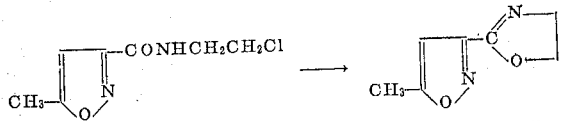

To a solution prepared by dissolving metallic sodium (5.8 parts by weight) in anhydrous ethanol (390 parts by volume) is added 3-(2-chloroethylcarbamoyl)-5-methylisoxazole (38.6 parts by weight) and the resultant mixture is refluxed for 1 hour. The hot reaction mixture is filtered to remove precipitated sodium chloride and the filtrate is concentrated. The residue is recrystallized from aqueous ethanol to give 3-(2-oxazolin-2-yl)-5-methylisoxazole (26.7 parts by weight) as prisms melting at 136 to 136.5° C.

The oxalate is constituted by crystals melting at 172 to 173° C., when crystallized from aqueous acetone.

Example 2

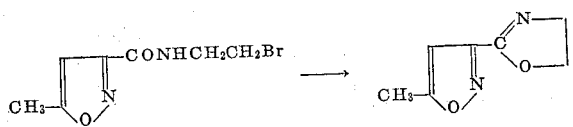

To a solution prepared by dissolving metallic sodium (5 parts by weight) in anhydrous ethanol (200 parts by volume) is added 3-(2-bromoethylcarbamoyl)-5-methylisoxazole (34 parts by weight) and the resultant mixture is refluxed for 1 hour. The insoluble substance is removed by filtration and the filtrate is concentrated. The residue is recrystallized from aqueous ethanol to give 3-(2-oxazolin-2-yl)-5-methylisoxazole (22 parts by weight) as prisms melting at 136 to 136.5° C.

Example 3

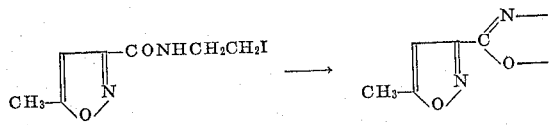

To a solution prepared by dissolving metallic sodium (4 parts by weight) in anhydrous ethanol (150 parts by volume) is added 3-(2-iodoethylcarbamoyl)-5-methylisoxazole (28 parts by weight) and the resultant mixture is refluxed for 1 hour. The insoluble substance is removed by filtration and the filtrate is concentrated. The residue is recrystallized from aqueous ethanol to give 3-(2-oxazin-2-yl)-5-methylisoxazole (14 parts by weight) as prisms melting at 136 to 136.5° C.

Example 4

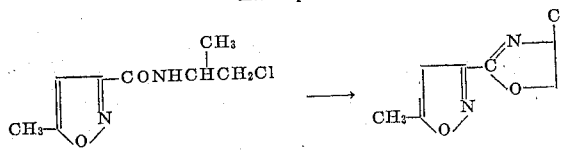

To a solution prepared by dissolving metallic sodium (7 parts by weight) in anhydrous ethanol (650 parts by volume) is added 3-(1-methyl-2-chloroethylcarbamoyl)-5-methylisoxazole (51 parts by weight) and the resultant mixture is refluxed for 1 hour. The insoluble substance is removed by filtration and the filtrate is concentrated. There is obtained 3-(4-methyl-2-oxazolin-2-yl)-5-methylisoxazole (43 parts by weight) as oily substance.

Example 5

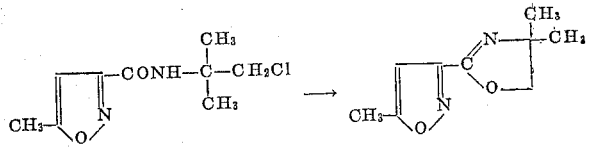

To a solution prepared by dissolving metallic sodium (3.25 parts by weight) in anhydrous ethanol (276 parts by volume) is added 3-(1,1-dimethyl-2-chloroethylcarbamoyl)-5-methylisoxazole (28.6 parts by weight) and the resultant mixture is refluxed for 1 hour. The insoluble substance is removed by filtration and the filtrate is concentrated. The residue is recrystallized from aqueous ethanol to give 3-(4,4-dimethyl-2-oxazolin-2-yl)-5-methylisoxazole (18.31 parts by weight) as crystals melting at 32 to 34° C.

The oxalate is constituted by crystals melting at 186 to 188° C., when crystallized from aqueous acetone.

Example 6

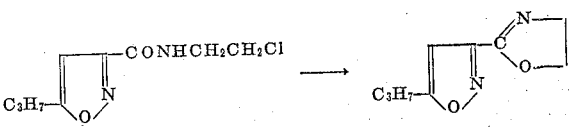

To a solution prepared by dissolving metallic sodium (2.5 parts by weight) in anhydrous methanol (200 parts by volume) is added 3-(2-chloroethylcarbamoyl)-5-propylisoxazole (23.3 parts by weight) and the resultant mixture is refluxed for 1 hour. The insoluble substance is removed by filtration and the filtrate is concentrated. The residue is recrystallized from aqueous ethanol to give 3-(2-oxazolin-2-yl)-5-propylisoxazole (17 parts by weight) as crystals melting at 51 to 53° C.

The oxalate is constituted by crystals melting at 160 to 163° C., when crystallized from aqueous acetone.

Example 7

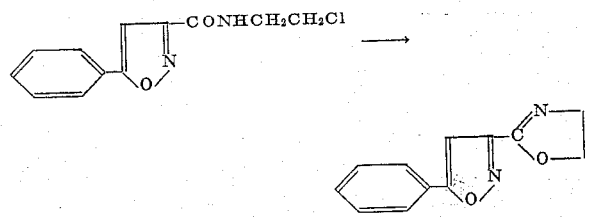

To a solution prepared by dissolving metallic sodium (1.6 parts by weight) in anhydrous ethanol (140 parts by volume) is added 3-(2-chloroethylcarbamoyl)-5-phenylisoxazole (13.6 parts by weight) and the resultant mixture is refluxed for 1 hour. Precipitated sodium chloride is removed by filtration and the filtrate is concentrated. The residue is recrystallized from aqueous ethanol to give 3-(2-oxazolin-2-yl)-5-phenylisoxazole (11.0 parts by weight) as scales melting at 118° C.

Example 8

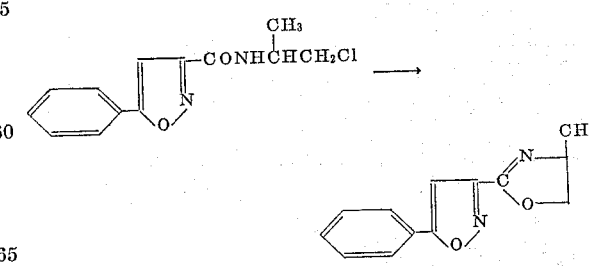

To a solution prepared by dissolving metallic sodium (1.0 part by weight) in anhydrous ethanol (93 parts by volume) is added 3-(1-methyl-2-chloroethylcarbamoyl)-5-phenylisoxazole (9.5 parts by weight) and the resultant mixture is refluxed for 1 hour. The insoluble substance is removed by filtration and the filtrate is concentrated. The residue is recrystallized from aqueous methanol to give 3-(4-methyl-2-oxazolin-2-yl)-5-phenylisoxazole (8.15 parts by weight) as crystals melting at 62 to 64° C.

Example 9

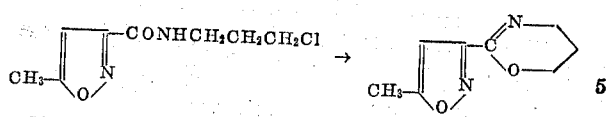

To a solution prepared by dissolving metallic sodium (1.9 parts by weight) in anhydrous ethanol (177 parts by volume) is added 3-(3-chloropropylcarbamoyl)-5-methylisoxazole (14.2 parts by weight) and the resultant mixture is refluxed for 1 hour. The hot reaction mixture is filtered to remove the precipitated sodium chloride and the filtrate is concentrated. The residue is recrystallized from ethyl acetate to give 3-(5,6-dihydro-4H-1,3-oxazin-2-yl)-5-methylisoxazole (10.2 parts by weight) as crystals melting at 83° C.

Example 10

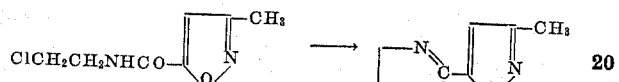

To a solution prepared by dissolving metallic sodium (1.5 parts by weight) in anhydrous ethanol (85 parts by volume) is added 3-methyl-5-(2-chloroethylcarbamoyl)-isoxazole (8.3 parts by weight) and the resultant mixture is refluxed for 1 hour. Precipitated sodium chloride is removed by filtration and the filtrate is concentrated. The residue is recrystallized from water to give 3-methyl-5-(2-oxazolin-2-yl)-isoxazole (4.4 parts by weight) as prisms melting at 132° C.

Example 11

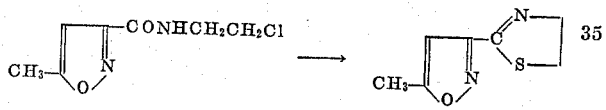

A mixture of 3-(2-chloroethylcarbamoyl)-5-methylisoxazole (6.3 parts by weight) and phosphorus pentasulfide (7.4 parts by weight) is heated in an oil bath at 130° C. (bath temperature) for 2 hours under nitrogen current. After cooling, the reaction mass is dissolved in 10% hydrochloric acid and filtered. The filtrate is made alkaline with 10% aqueous ammonia, the precipitated crystals are collected by filtration, dried and recrystallized from ethanol to give 3-(2-thiazolin-2-yl)-5-methylisoxazole (2.5 parts by weight) as plates melting at 84 to 85° C.

Example 12

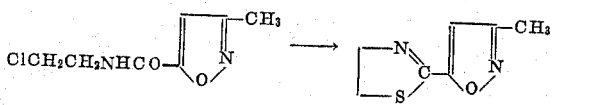

3 - methyl-5-(2-chloroethylcarbamoyl)-isoxazole (18.9 parts by weight) is reacted with phosphorus pentasulfide (22.2 parts by weight) in a similar manner as described in the Example 11. The crude product is recrystallized from ethanol to give 3-methyl-5-(2-thiazolin-2-yl)-isoxazole (7.5 parts by weight) as crystals melting at 75° C.

What is claimed is:

1. A member selected from the group consisting of compounds of the formula

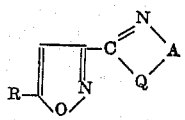

and pharmaceutically acceptable non-toxic salts thereof, wherein R is a member selected from the group consisting of lower alkyl and phenyl, Q is a member selected from the group consisting of oxygen and sulfur and A is a member selected from the group consisting of 1,2- and 1,3-alkylene having 2 to 10 carbon atoms.

2. A member selected from the group consisting of compounds of the formula

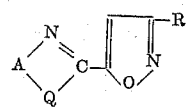

and pharmaceutically acceptable non-toxic salts thereof, wherein R is a member selected from the group consisting of lower alkyl and phenyl, Q is a member selected from the group consisting of oxygen and sulfur and A is a member selected from the group consisting of 1,2- and 1,3-alkylene having 2 to 10 carbon atoms.

3. A member selected from the group consisting of compounds of the formula

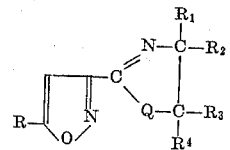

and pharmaceutically acceptable non-toxic salts thereof, wherein R is a member selected from the group consisting of lower alkyl and phenyl, Q is a member selected from the group consisting of oxygen and sulfur and $R_1$, $R_2$, $R_3$ and $R_4$ each is a member selected from the group consisting of hydrogen and lower alkyl.

4. A member selected from the group consisting of compounds of the formula

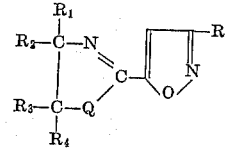

and pharmaceutically acceptable non-toxic salts thereof, wherein R is a member selected from the group consisting of lower alkyl and phenyl, Q is a member selected from the group consisting of oxygen and sulfur and $R_1$, $R_2$, $R_3$ and $R_4$ each is a member selected from the group consisting of hydrogen and lower alkyl.

5. A member selected from the group consisting of compounds of the formula

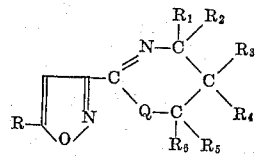

and pharmaceutically acceptable non-toxic salts thereof, wherein R is a member selected from the group consisting of lower alkyl and phenyl, Q is a member selected from the group consisting of oxygen and sulfur and $R_1$, $R_2$, $R_3$, $R_4$, $R_5$ and $R_6$ each is a member selected from the group consisting of hydrogen and lower alkyl.

6. A member selected from the group consisting of compounds of the formula

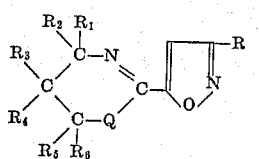

and pharmaceutically acceptable non-toxic salts thereof, wherein R is a member selected from the group consisting of lower alkyl and phenyl, Q is a member selected from the group consisting of oxygen and sulfur and $R_1$, $R_2$, $R_3$, $R_4$, $R_5$ and $R_6$ each is a member selected from the group consisting of hydrogen and lower alkyl.

7. 3-(2-oxazolin-2-yl)-5-methylisoxazole.
8. 3-(4-methyl-2-oxazolin-2-yl)-5-methylisoxazole.
9. 3-(4,4-dimethyl-2-oxazolin-2-yl)-5-methylisoxazole.
10. 3-(2-oxazolin-2-yl)-5-propylisoxazole.
11. 3-(2-oxazolin-2-yl-5-phenylisoxazole.
12. 3-(4-methyl-2-oxazolin-2-yl)-5-phenylisoxazole.
13. 3 - (5,6 - dihydro - 4H - 1,3 - oxazin-2-yl)-5-methyl isoxazole.
14. 3-methyl-5-(2-oxazolin-2-yl)-isoxazole.
15. 3-(2-thiazolin-2-yl)-5-methylisoxazole.
16. 3-methyl-5-(2-thiazolin-2-yl)-isoxazole.

References Cited by the Examiner

Giammanco: Gazz. Chim. Ital., vol. 87 (1957), pages 1139–46.

ALEX MAZEL, *Primary Examiner.*

RICHARD J. GALLAGHER, *Assistant Examiner.*